(No Model.)

C. L. SMITH.
HOSE COUPLING.

No. 409,512. Patented Aug. 20, 1889.

WITNESSES

INVENTOR
C. L. Smith
BY
ATTORNEY

UNITED STATES PATENT OFFICE.

CHARLES L. SMITH, OF CLEVELAND, OHIO.

HOSE-COUPLING.

SPECIFICATION forming part of Letters Patent No. 409,512, dated August 20, 1889.

Application filed April 15, 1889. Serial No. 307,221. (No model.)

*To all whom it may concern:*

Be it known that I, CHARLES L. SMITH, a resident of Cleveland, in the county of Cuyahoga and State of Ohio, a citizen of the United States, have invented a certain new and Improved Hose-Coupling; and I do hereby declare the following to be a full, clear, and complete description thereof.

My improvement relates to hose-couplings; and the invention consists in the peculiar construction thereof, the object of which is to combine simplicity and a ready and reliable attachment with durability.

That the invention may be fully understood, reference will be had to the annexed specification and accompanying drawings, in which—

Figure 1:
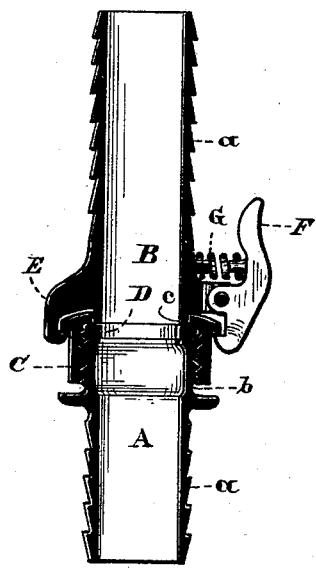
Figure 2:
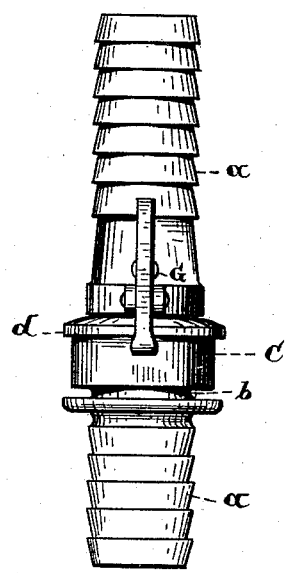
Figure 3:
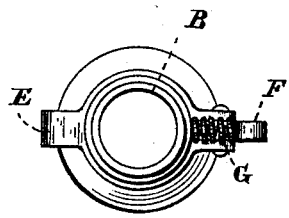
Figure 4:
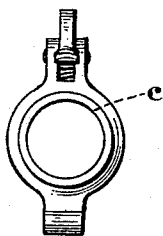

Figure 1 represents a central section of the coupling above referred to; Fig. 2, an outside view thereof, Fig. 3, a plain view, and Fig. 4 a face view, of the respective sections of said couplings.

Like letters of reference denote like parts in the drawings and specification.

In the drawings the metallic coupling ends are shown without hose attached thereto, which attachment is made in the usual way. A represents one and B the other end of said coupling. The section A may either be roughened, as seen at $a$, to receive and retain the hose in connection therewith, or it may be attached to the terminal of the hydrant-pipe. The nipple $b$ of said section is threaded for adjustable connection of the nut C, as seen in Fig 1, and the packing-ring D is held between said nut C and nipple $b$ to form a water-tight joint with the annular projection $c$ of the section B. Said section is provided with the hook E and the spring-hook F, which engage under the flange $d$ of the nut C, as seen in Figs. 1 and 2. The hook E forms an integral part of the section B, or is rigidly connected therewith, whereas F is a snatch-hook, and is pivotally attached to the section B to allow of a spring engagement of said hooks under the flange of the nut C—that is, the hook E is first connected with said flange by approaching obliquely toward the section B in relation to the section A, the hook F then being drawn over the conical or spherical face side of the nut C. The spring G, which is interposed between said hook and the section B, effects a positive engagement of the hook as soon as it passes over the flange $d$. To disengage the section A from the section B requires only a depression on the hook F. The connection can be as conveniently separated as it is connected.

As above stated, the water-tight joint of the projection $c$ is formed with the packing-ring D. Thus on adjusting the nut C upon the nipple B said joint can be so controlled as always to be water-tight, and in case of leakage by the adjustment of the nut C to the packing the joint can be made tight.

What I claim as my invention, and desire to secure by Letters Patent, is—

In combination, the sections A B, the ring D, interposed between their adjacent ends, the nut C, bearing upon the ring D, said nut having a flange $d$, and the hooks on the section B, adapted to fit beneath said flange, substantially as described.

In testimony whereof I affix my signature in presence of two witnesses.

CHARLES L. SMITH.

Witnesses:
 W. H. BURRIDGE,
 FRANK HIGLEY.